United States Patent
Chen et al.

(10) Patent No.: US 12,417,088 B2
(45) Date of Patent: Sep. 16, 2025

(54) METHOD OF PERFORMING FULL FIRMWARE UPDATE PROCEDURE ON EMBEDDED ELECTRONIC DEVICE AND RELATED EMBEDDED ELECTRONIC DEVICE

(71) Applicant: Moxa Inc., New Taipei (TW)

(72) Inventors: Ching-Hung Chen, New Taipei (TW); Kun-Lung Liao, New Taipei (TW)

(73) Assignee: Moxa Inc., New Taipei (TW)

( * ) Notice: Subject to any disclaimer, the term of this patent is extended or adjusted under 35 U.S.C. 154(b) by 204 days.

(21) Appl. No.: 18/515,228

(22) Filed: Nov. 20, 2023

(65) Prior Publication Data

US 2024/0338198 A1    Oct. 10, 2024

Related U.S. Application Data

(60) Provisional application No. 63/458,166, filed on Apr. 10, 2023.

(30) Foreign Application Priority Data

Nov. 3, 2023   (TW) ................................ 112142470

(51) Int. Cl.
  *G06F 9/44*   (2018.01)
  *G06F 8/65*   (2018.01)
(52) U.S. Cl.
  CPC .......................................... *G06F 8/65* (2013.01)
(58) Field of Classification Search
  CPC .......................................................... G06F 8/65

USPC .......................................................... 717/168
See application file for complete search history.

(56) References Cited

U.S. PATENT DOCUMENTS

| 11,042,365 | B2 | 6/2021 | Li |
| 11,416,236 | B2 * | 8/2022 | Geng ................. H04L 69/04 |
| 2010/0169709 | A1 * | 7/2010 | Chiu ................. G06F 11/1004 |
| | | | 711/E12.008 |
| 2013/0111455 | A1 | 5/2013 | Li |
| 2018/0173592 | A1 | 6/2018 | Heo |
| 2023/0067872 | A1 | 3/2023 | Xu |

FOREIGN PATENT DOCUMENTS

| CN | 110704084 A | 1/2020 |
| CN | 110874239 A | 3/2020 |
| CN | 111240722 A | 6/2020 |

(Continued)

*Primary Examiner* — Evral E Bodden
(74) *Attorney, Agent, or Firm* — Winston Hsu

(57) ABSTRACT

When performing full firmware update procedure on an electronic device, a full firmware update file is divided into multiple pieces of update data and then arranged into a first and a second sub update files, a header file associated with the sizes of each sub update file is created, and the header file and the two sub update files are merged into a full FOTA file before being uploaded to the electronic device. The electronic device extracts each sub update file based on the header file and stores the extracted first and second sub update file respectively into a first and a second storage units. After performing the firmware update steps associated with the first sub update file, the second sub update file stored in the second storage unit is copied to the first storage unit before performing the firmware update steps associated with the second sub update file.

20 Claims, 10 Drawing Sheets

(56) References Cited

FOREIGN PATENT DOCUMENTS

| | | | |
|---|---|---|---|
| CN | 113641382 | A | 11/2021 |
| CN | 113642382 | A | 11/2021 |
| CN | 114253570 | A | 3/2022 |
| TW | 201222413 | A1 | 6/2012 |
| TW | 201516869 | A | 5/2015 |
| WO | 2019/020111 | A1 | 1/2019 |
| WO | 2021/131754 | A1 | 7/2021 |

* cited by examiner

METHOD OF PERFORMING FULL FIRMWARE UPDATE PROCEDURE ON EMBEDDED ELECTRONIC DEVICE AND RELATED EMBEDDED ELECTRONIC DEVICE

CROSS REFERENCE TO RELATED APPLICATIONS

This application claims the benefit of U.S. Provisional Application No. 63/458,166, filed on Apr. 10, 2023. The content of the application is incorporated herein by reference.

BACKGROUND OF THE INVENTION

1. Field of the Invention

The present invention is related to a method of performing full firmware update procedure on an embedded electronic device and a related embedded electronic device, and more particularly, to a method of performing full firmware update procedure using FOTA technology on an embedded electronic device with limited built-in memory space and a related embedded electronic device.

2. Description of the Prior Art

An embedded electronic device typically includes hardware, software, and firmware. Hardware generally refers to all the physical components required for a system to function, such as motherboards, graphics cards, CPUs, fans, webcams, and power supplies, each of which may be connected to each other through circuit boards. Software generally refers to non-physical products created in programming languages, such as applications (APPs), web pages, and various operating systems which are used to enable hardware to provide users with various services. Firmware refers to the software embedded in a hardware device, and may control the hardware device through the programming language. Firmware is commonly installed in a basic input/output system chip, an optical drive, a burner, an Internet protocol gateway/router, a wireless access point (WAP) and a modem on the motherboard. A user can remotely control and operate the settings and functions of the firmware through a designated interface, monitor the current operational status of the hardware and set/upgrade/adjust the hardware.

Firmware may be viewed as a kit which contains all the official proprietary software and is usually stored in the flash memory of the embedded electronic device. The user may perform a firmware update procedure through a specific device and a specific method. The main purpose of firmware updates includes correcting errors in the source codes, adding or improving execution functions, adjusting system security, and improving firmware efficiency.

In a first prior art method of updating the firmware, the embedded electronic device is connected to the computer via a universal serial bus (USB) port. Next, the firmware update procedure may be performed off-line by downloading the latest version of the firmware file in the official FTF format using the FlashTool flashing software. This prior method can transmit large amount of firmware files for a full firmware update procedure. However, such wired data transmission is not feasible or extremely inconvenient in certain application fields.

In a second prior art method, a firmware over-the-air (FOTA) technology is used to automatically update the operating system of the embedded electronic device. By connecting to a server, the embedded electronic device may download the latest version of the firmware file and update the firmware accordingly without connecting to the computer host. However, if an error occurs in the root file system (rootfs) or a modem of the embedded electronic device, the firmware update procedure may not be able to be performed on-line. In addition, the storage space of the built-in flash memory of a mobile electronic device is usually insufficient to support the file size required for a full firmware update procedure using FOTA technology. Therefore, an electronic device with limited built-in memory space can only use the first prior art method when performing a full firmware update procedure, which is inconvenient for the users.

Therefore, there is a need for a method of performing a full firmware update procedure on an electronic device with limited built-in memory space using FOTA technology.

SUMMARY OF THE INVENTION

The present invention provides a method of performing a full firmware update procedure on an embedded electronic device. The method includes dividing a full firmware update file into a plurality pieces of update data; arranging the plurality pieces of update data into a first sub update file and a second sub update file; creating a header file associated with a size of each sub update file; merging the header file, the first sub update file and the second sub update file sequentially into a full FOTA file; uploading the full FOTA file to the embedded electronic device; extracting the first sub update file from the full FOTA file based on the header file and storing the extracted first sub update file in a first storage unit of the embedded electronic device; freeing up memory space of a second storage unit in a sub-system module of the embedded electronic device; extracting the second sub update file from the full FOTA file based on the header file and storing the extracted second sub update file in the second storage unit; performing one or multiple firmware update steps associated with the first sub update file stored in the first storage unit at a first time point; copying the second sub update file stored in the second storage unit to the first storage unit at a second time point which occurs after the first time point; and performing one or multiple firmware update steps associated with the second sub update file stored in the first storage unit at a third time point which occurs after the second time point. The first storage unit provides a first available memory space during an operation of the embedded electronic device. The second storage unit provides a second available memory space during the operation of the embedded electronic device. A size of the full FOTA file is larger than a size of the first available memory space. The size of the full FOTA file is not larger than a total size of the first available memory space and the second available memory space.

The present invention also provides an embedded electronic device which performs a full firmware update procedure. The embedded electronic device includes a first storage unit configured to provide a first available memory space during an operation of the embedded electronic device, a sub-system module having a built-in second storage unit configured to provide a second available memory space during the operation of the embedded electronic device, and a processing module. The processing module configured to receive a full FOTA file associated with a full firmware update file and including a header file, a first sub update file and a second sub update file; extract the first sub update file from the full FOTA file based on the header file and store the extracted first sub update file in the first storage unit; free up memory space of the second storage unit in the sub-system module; extract the second sub update file from the full FOTA file based on the header file and store the extracted second sub update file in the second storage unit; perform one or multiple firmware update steps associated with the first sub update file stored in the first storage unit at a first time point; copy the second sub update file stored in the second storage unit to the first storage unit at a second time point which occurs after the first time point; and perform one or multiple firmware update steps associated with the second sub update file stored in the first storage unit at a third time point which occurs after the second time point. The full firmware update file is divided into a plurality pieces of update data. The plurality pieces of update data are arranged into the first sub update file and the second sub update file. The header file is associated with a size of each sub update file. A size of the full FOTA file is larger than a size of the first available memory space. The size of the full FOTA file is not larger than a total size of the first available memory space and the second available memory space.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
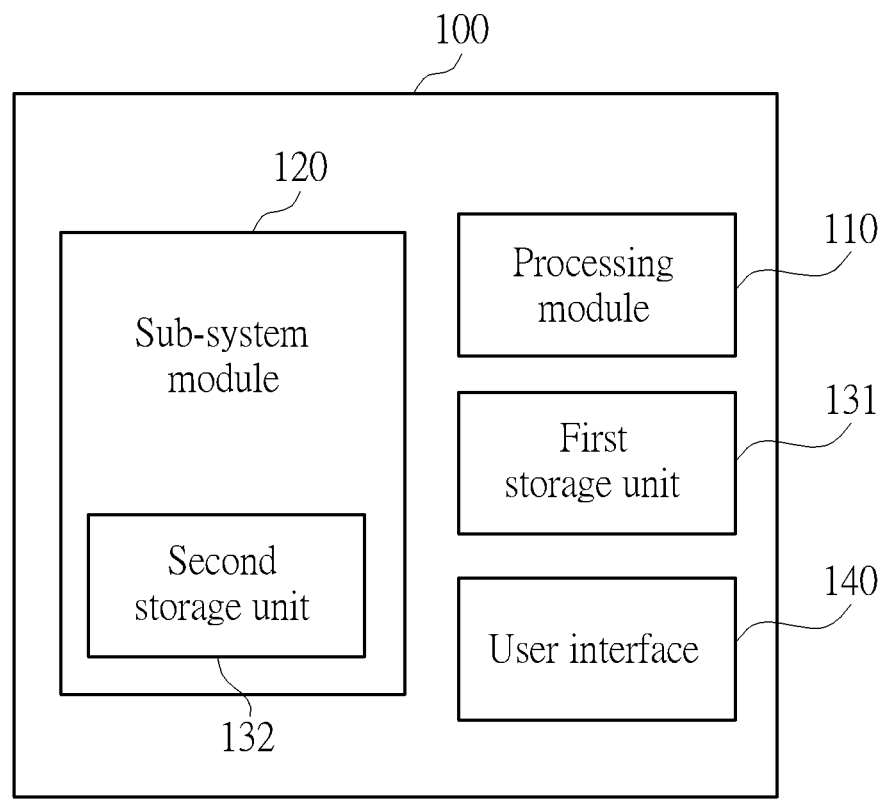
FIG. 1 is a functional diagram illustrating an embedded electronic device according to an embodiment of the present invention.

FIG. 1 is a functional diagram illustrating an embedded electronic device 100 according to an embodiment of the present invention. The embedded electronic device 100 includes at least a processing module 110, a sub-system module 120, a first storage unit 131 and a user interface 140.

In an embodiment of the present invention, the embedded electronic device 100 may be an Internet of Things (IoT) device, a mobile Internet device (MID) or a smart phone designed for industrial, medical storage or automobile application. However, the type and application of the embedded electronic device 100 do not limit the scope of the present invention.

In an embodiment of the present invention, the sub-system module 120 includes at least a second storage unit 132 for storing sub-system firmware which provides functions required by the application of the embedded electronic device 100. For example, when the embedded electronic device 100 is an Internet Service Provider (ISP), the sub-system module 120 may be a modem module. However, the types of the embedded electronic device 100 and its built-in sub-system module 120 do not limit the scope of the present invention.

In an embodiment of the present invention, the first storage unit 131 may be a built-in memory of the embedded electronic device 100, such as an embedded multimedia card (eMMC), a universal flash storage (UFS) or a non-volatile memory (NVMe). However, the type of the first storage unit 131 does not limit the scope of the present invention.

In an embodiment of the present invention, the second storage unit 132 may be a built-in memory of the sub-system module 120 and may include one or multiple types of memory devices. For example, the second storage unit 132 may include flash memory, random access memory (RAM) and/or read-only memory (ROM). However, the type of the second storage unit 132 does not limit the scope of the present invention.

In an embodiment of the present invention, the embedded electronic device 100 is a product designed for ultra-thin and light-weight applications, wherein its built-in first storage unit 131 only provides limited available memory space. More specifically, during the operation of the embedded electronic device 100, the first storage unit 131 is unable to provide sufficient available memory space for performing a full firmware update procedure.

In an embodiment of the present invention, during the operation of the embedded electronic device 100, the available memory space provided by the first storage unit 131 is smaller than the minimum memory space required for performing the full firmware update procedure, but the total available memory space provided by the first storage unit 131 and the second storage unit 132 is larger than the minimum memory space required for performing the full firmware update procedure. Therefore, when the embedded electronic device 100 is requested to perform the full firmware update procedure, the present invention may further use the second storage unit 132 of the sub-system module 120 to provide extra memory space for supporting the full firmware update procedure.

Figure 2:
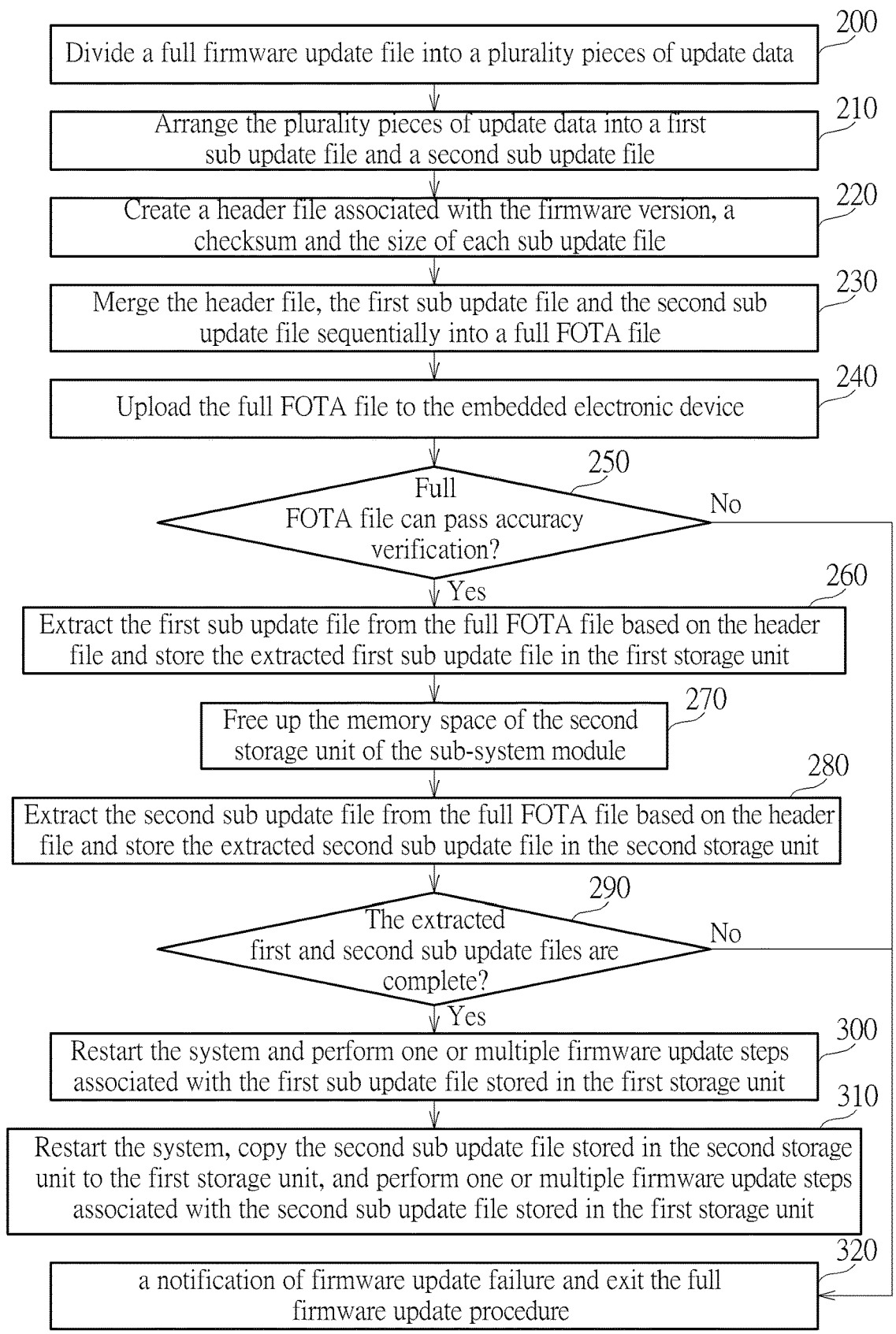
FIG. 2 is a flowchart illustrating a method of performing a full firmware update procedure on an embedded electronic device using FOTA technology according to an embodiment of the present invention.

FIG. 2 is a flowchart illustrating a method of performing a full firmware update procedure on the embedded electronic device 100 using FOTA technology according to an embodiment of the present invention. The flowchart depicted in FIG. 2 includes the following steps:

Step 200: divide a full firmware update file into a plurality pieces of update data.

Step 210: arrange the plurality pieces of update data into a first sub update file and a second sub update file.

Step 220: create a header file associated with the firmware version, a checksum and the size of each sub update file.

Step 230: merge the header file, the first sub update file and the second sub update file sequentially into a full FOTA file.

Step 240: upload the full FOTA file to the embedded electronic device 100.

Step 250: determine whether the full FOTA file can pass an accuracy verification; if yes, execute step 260; if no, execute step 320.

Step 260: extract the first sub update file from the full FOTA file based on the header file and store the extracted first sub update file in the first storage unit 131.

Step 270: free up the memory space of the second storage unit 132 of the sub-system module 120.

Step 280: extract the second sub update file from the full FOTA file based on the header file and store the extracted second sub update file in the second storage unit 132.

Step 290: determine whether the extracted first sub update file and the extracted second sub update file are complete; if yes, execute step 300; if no, execute step 320.

Step 300: restart the system and perform one or multiple firmware update steps associated with the first sub update file stored in the first storage unit 131.

Step 310: restart the system, copy the second sub update file stored in the second storage unit 132 to the first storage unit 131, and perform one or multiple firmware update steps associated with the second sub update file stored in the first storage unit 131.

Step 320: send a notification of firmware update failure and exit the full firmware update procedure.

In step 200, the full firmware update file is divided into the plurality pieces of update data. Each piece of update data may be any one among a kernel update data, a root file system (rootfs) update data, an original equipment manufacturer (OEM) update data and a sub-system firmware update data. In an embodiment, the full firmware update file may be divided into the plurality pieces of update data using any file splitter tool or software in step 200.

In step 210, the plurality pieces of update data are arranged into the first sub update file and the second sub update file. For illustrative purpose, it is assumed that the full firmware update file is divided into (M+N) pieces of update data, wherein the first sub update file includes N pieces of update data, the second sub update file includes M pieces of update data, and M and N are positive integers. The content of each piece of update data in the first sub update file is different from the content of each piece of update data in the second sub update file. As previously stated, the minimum memory space required for performing the full firmware update procedure is larger than the size of the available memory space provided by the first storage unit 131, but is not larger than the total size of the available memory space provided by the first storage unit 131 and the second storage unit 132. In an embodiment, the sizes of the first sub update file and the second sub update file (i.e., the values of M and N) may be determined according to the ratio of the size of the first available memory space provided by the first storage unit 131 to the size of the second available memory space provided by the second storage unit 132.

In an embodiment of the present invention, the second sub update file includes the sub-system firmware update data of the full firmware update file, wherein the one or multiple firmware update steps associated with the first sub update file are performed earlier than the one or multiple firmware update steps associated with the second sub update file.

Figure 3:
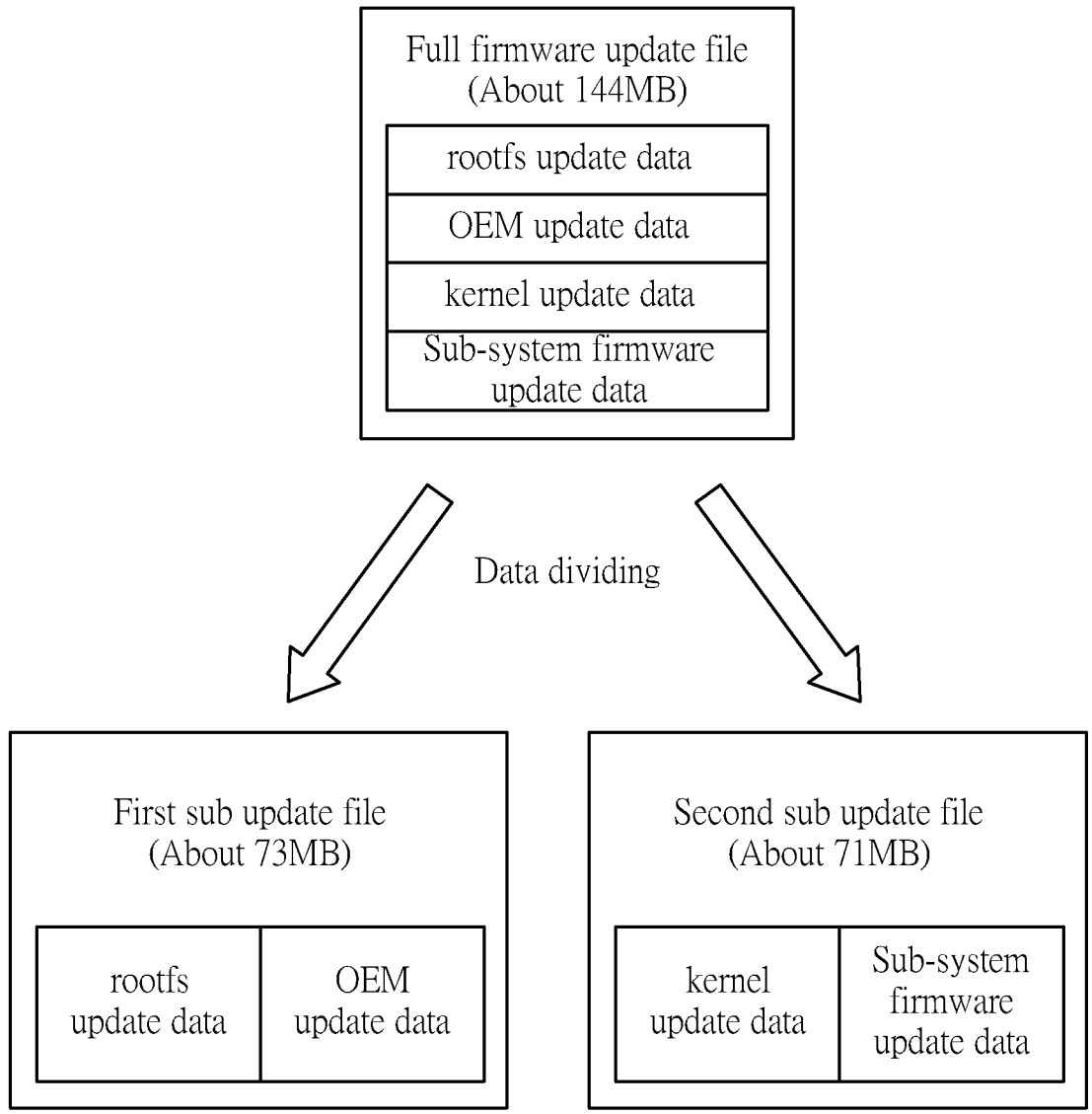
FIG. 3 is a diagram illustrating the data structure in the embedded electronic device after executing the file-dividing step of the full firmware update procedure according to an embodiment of the present invention.

FIG. 3 is a diagram illustrating the data structure in the embedded electronic device 100 after executing step 210 of the full firmware update procedure according to an embodiment of the present invention. For illustrative purpose, it is assumed that the full firmware update file is divided into 4 pieces of update data: the rootfs update data, the OEM update data, the kernel update data, and the sub-system firmware update data, wherein the total size of the full firmware update file is about 144 MB. Assuming that the size of the first available memory space provided by the first storage unit 131 is similar to the size of the second available memory space provided by the second storage unit 132, the first sub update file may include the rootfs update data and the OEM update data (with a total size of about 73 MB), and the second sub update file may include the kernel update data and the sub-system firmware update data (with a total size of about 71 MB) after executing step 210, as depicted in FIG. 3.

In the embodiment of the present invention, the content of each piece of update data in the first sub update file is different from the content of each piece of update data in the second sub update file, and the second sub update file at least includes the sub-system firmware update data.

In step 220, the header file associated with the firmware version, the checksum and the size of each sub update file is created. In step 230, the header file, the first sub update file and the second sub update file are merged sequentially into the full FOTA file.

Figure 4:
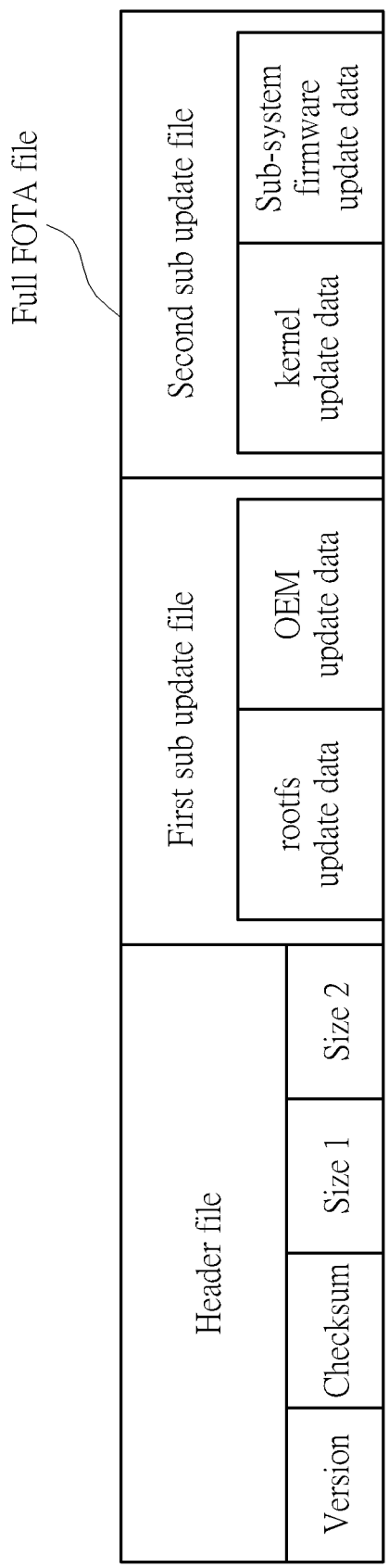
FIG. 4 is a diagram illustrating the full FOTA file created by the embedded electronic device when performing the full firmware update procedure according to an embodiment of the present invention.

FIG. 4 is a diagram illustrating the full FOTA file created by the embedded electronic device 100 when performing the full firmware update procedure according to an embodiment of the present invention. In an embodiment, the checksum may be cyclic redundancy check (CRC) for detecting accidental errors to digital data after data transmission or storage. In another embodiment, the checksum may be any cryptographic hash function containing fixed string of digits which are generated based on a network data package or a computer file. In an embodiment, Size 1 represents the file size of the first sub update file and its value may be associated with the number of bits contained in the first sub update file. Size 2 represents the file size of the second sub update file and its value may be associated with the number of bits contained in the second sub update file. However, the format of the header file and the type of the checksum do not limit the scope of the present invention.

In step 240, the full FOTA file may be uploaded to the embedded electronic device 100 via the user interface 140. In step 250, it is then determined whether the full FOTA file can pass the accuracy verification. In an embodiment, the processing unit 110 of the embedded electronic device 100 may examine the content of the header file in the full FOTA file and verify the correctness of the checksum. When determining that the full FOTA file cannot pass the accuracy verification, it indicates that data loss or damage may have happened during the process of uploading the full FOTA file to the embedded electronic device 100. Under such circumstance, step 320 is then executed for sending the notification of firmware update failure and exiting the full firmware update procedure.

When it is determined in step 250 that the full FOTA file can pass the accuracy verification, steps 260 and 280 are then executed for respectively extracting the first sub update file and the second sub update file from the full FOTA file based on the header file. As depicted in the embodiment of FIG. 4, the processing unit 110 of the embedded electronic device 100 may acquire the file size of the first sub update file (i.e., Size 1) and the file size of the second sub update file (i.e., Size 2) based on the header file of the full FOTA file, and the extract corresponding contents of the first sub update file and the second sub update file from the full FOTA file based on Size 1 and Size 2. For example, when the value of Size 1 is equal to m and the value of Size 2 is equal to n (m and n are positive integers), the processing unit 110 may extract the first bit to the $m^{th}$ bit of data located after the header file as the first sub update file, and may extract the $(m+1)^{th}$ bit to the $n^{th}$ bit of data located after the header file as the second sub update file.

FIGS. 5-9 are diagram illustrating the data structures in the embedded electronic device 100 at each stage of the full firmware update procedure using FOTA technology according to an embodiment of the present invention. For illustrative purpose, it is assumed that current rootfs data, current OEM data, current kernel data, and current sub-system firmware data is stored in the embedded electronic device 100 before performing the full firmware update procedure.

Figure 5:
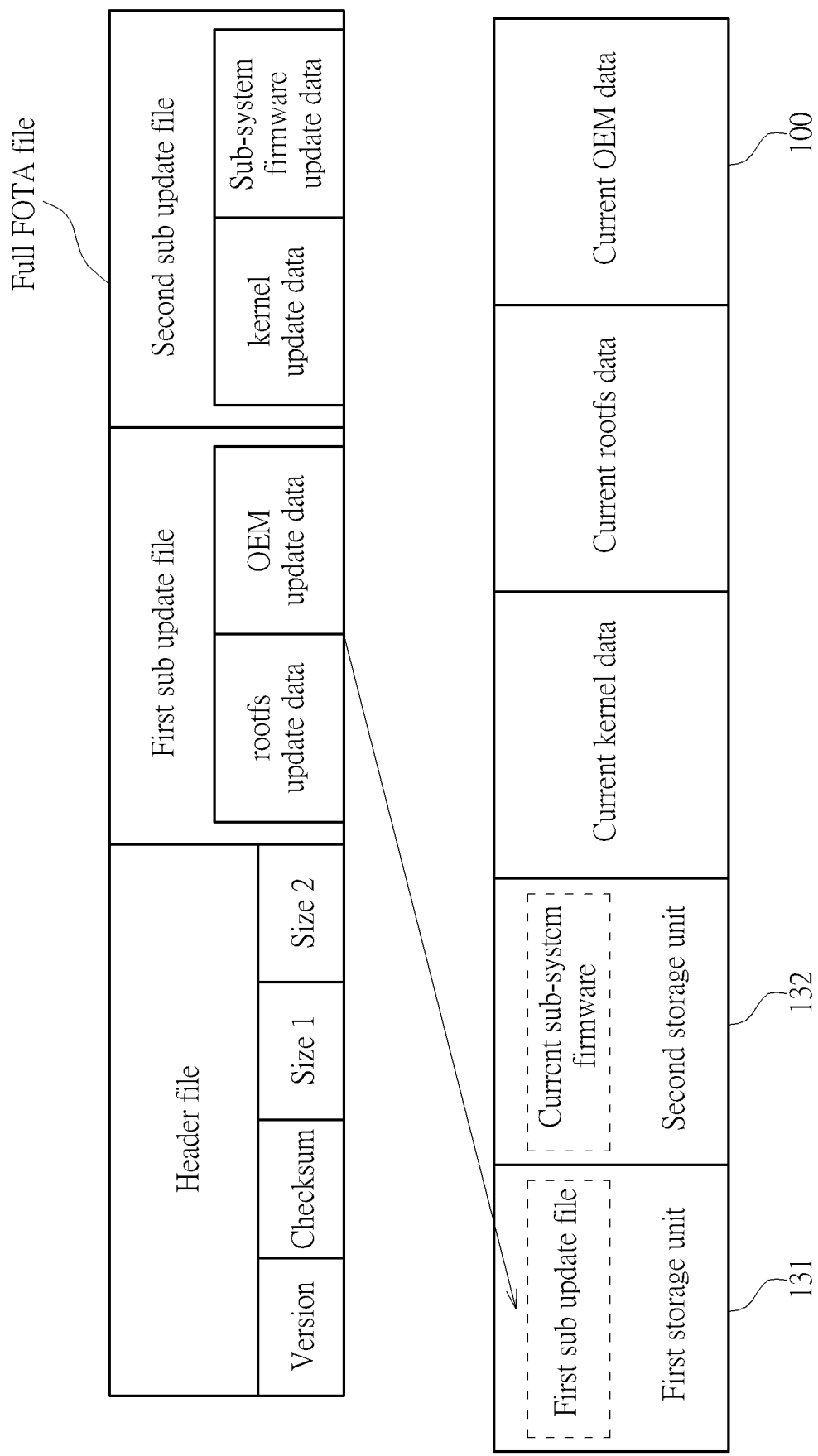
FIGS. 5-9 are diagrams illustrating the data structures in the embedded electronic device at each stage of the full firmware update procedure using FOTA technology according to an embodiment of the present invention.

In step 260, the first sub update file extracted from the full FOTA file is stored in the first storage unit 131 of the embedded electronic device 100, as depicted in FIG. 5.

Figure 6:
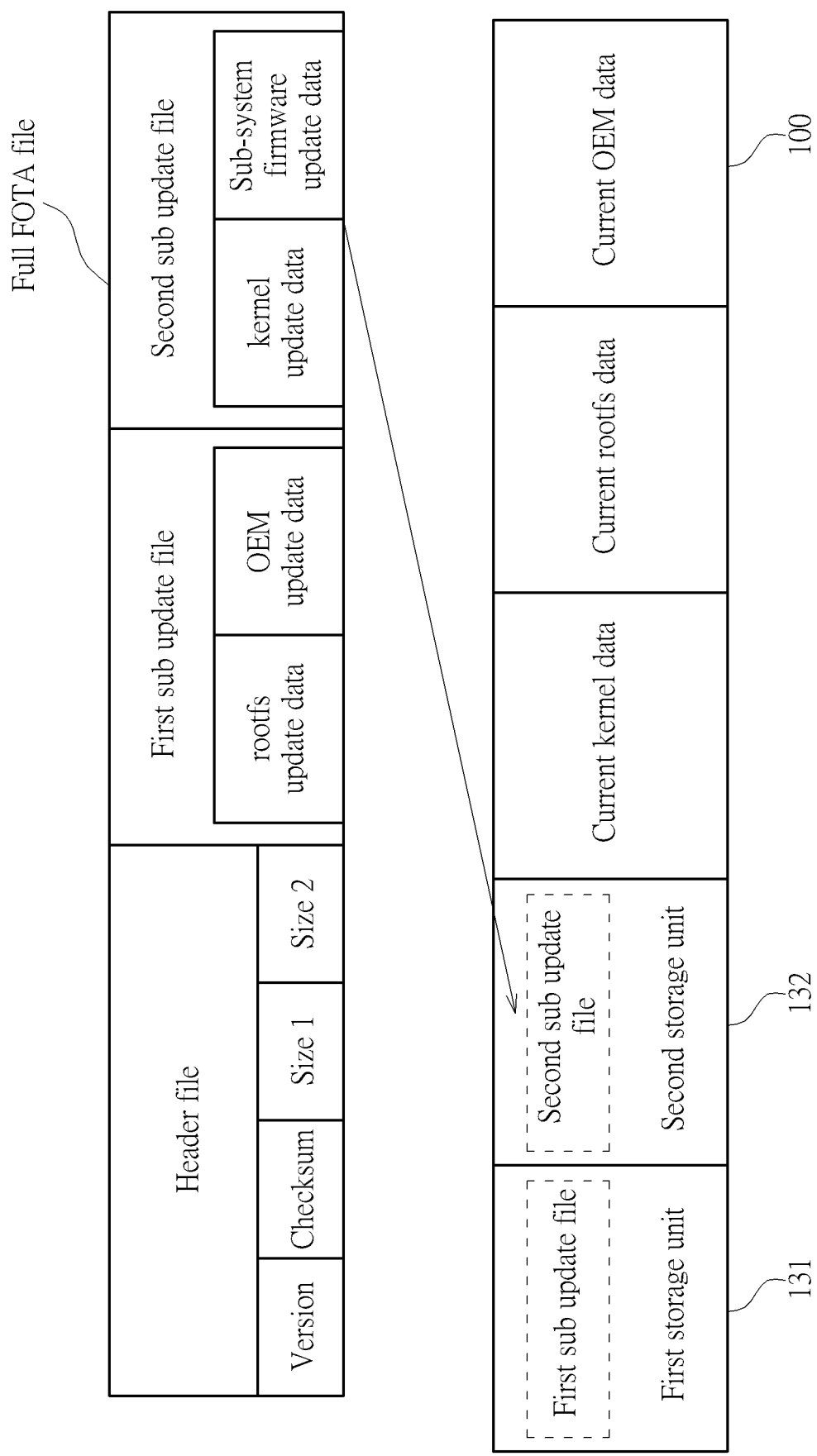

In step 270, the memory space of the second storage unit 132 in the sub-system module 120 is freed up. In step 280, the second sub update file extracted from the full FOTA file is stored in the second storage unit 132 of the sub-system module 120, as depicted in FIG. 6.

In step 290, the processing unit 110 is configured to determine whether the extracted first sub update file and the extracted second sub update file are complete. When determining that the extracted first sub update file and the extracted second sub update file are not complete, it indicates that data loss or damage may have happened during the process of extracting and/or storing each sub update file. Under such circumstance, step 320 is then executed for sending the notification of firmware update failure and exiting the full firmware update procedure.

Figure 7:
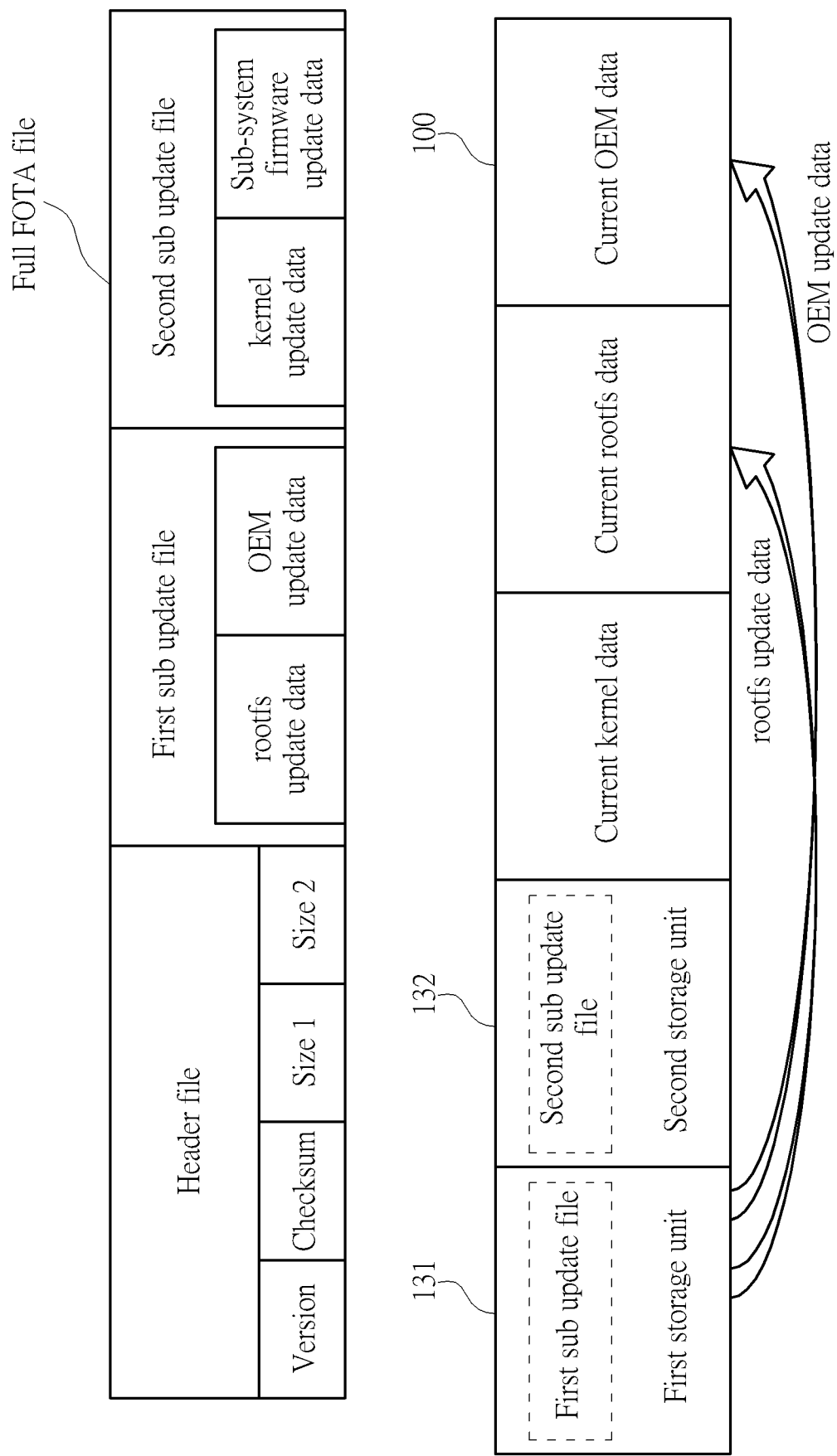

When it is determined in step 290 that the extracted first sub update file and the extracted second sub update file are complete, step 300 is executed for restarting the system and performing the one or multiple firmware update steps associated with the first sub update file stored in the first storage unit 131. More specifically, after restarting the system in step 300, the processing unit 110 is configured to update the current rootfs data according to the rootfs update data in the first sub update file and update the current OEM data according to the OEM update data in the first sub update file, as depicted in FIG. 7.

Figure 8:
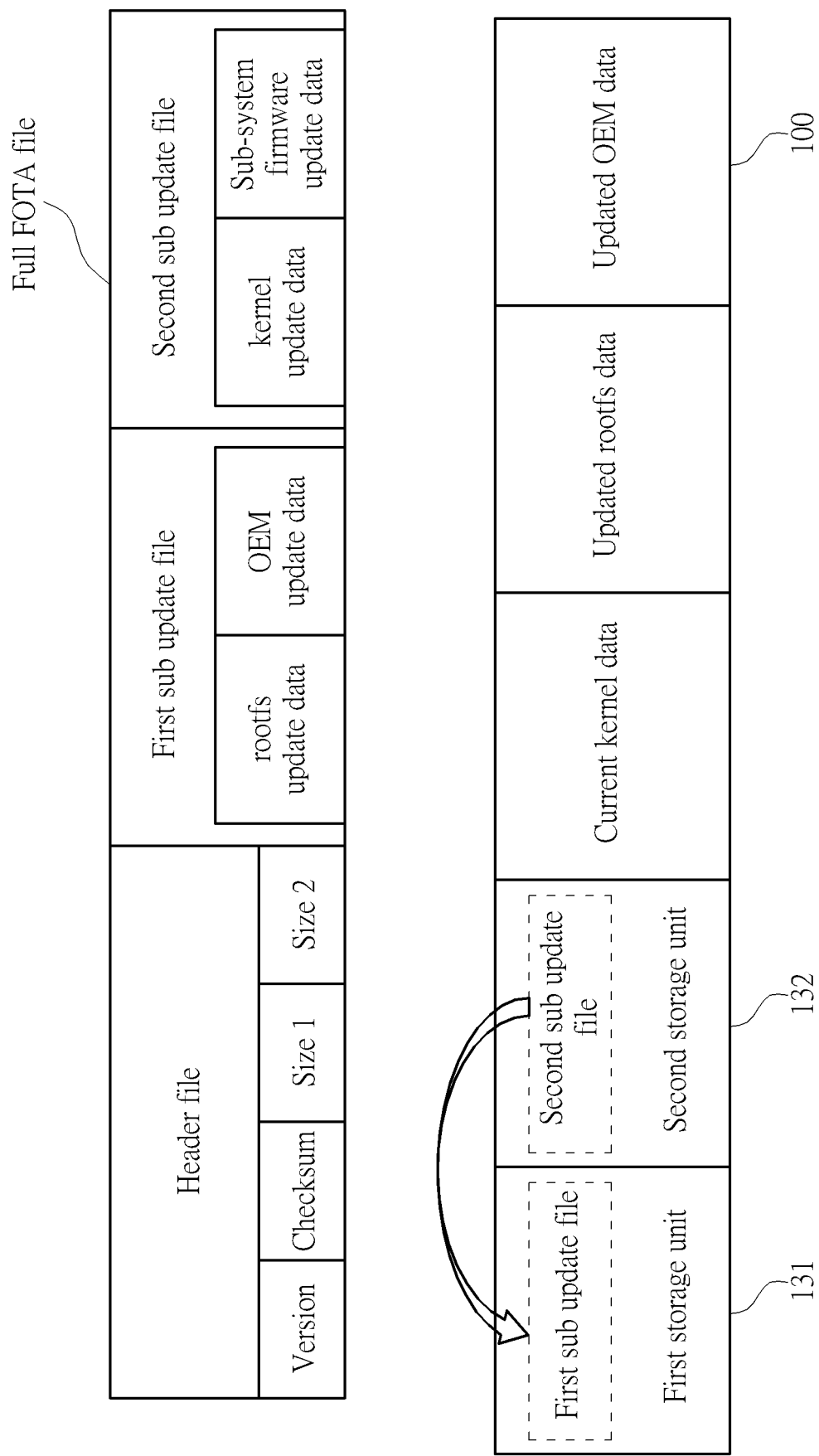

After performing the one or multiple firmware update steps associated with the first sub update file, step 310 is executed for restarting the system again. Next, the second sub update file stored in the second storage unit 132 is copied to the first storage unit 131, as depicted in FIG. 8.

Figure 9:
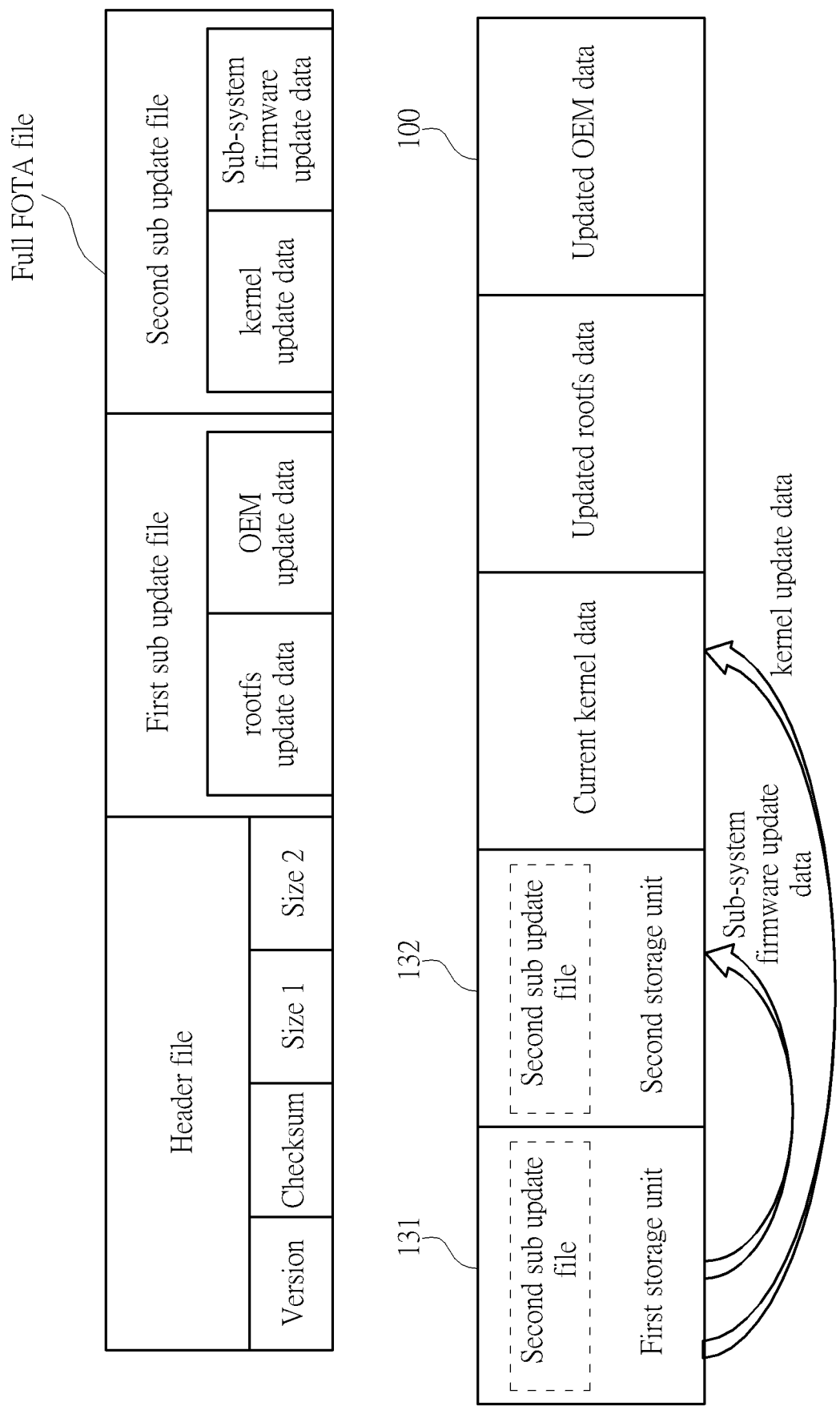

Next, the one or multiple firmware update steps associated with the second sub update file stored in the first storage unit 131 may be performed. More specifically, after copying the second sub update file stored in the second storage unit 132 to the first storage unit 131, the processing unit 110 is configured to update the current kernel data according to the kernel update data in the second sub update file and update the current sub-system module 120 according to the sub-system update data in the second sub update file, as depicted in FIG. 9.

In an embodiment, after restarting the system in steps 300 and 310, the embedded electronic device 100 is configured to perform an original equipment manufacturer secondary boot loader (OEMSBL) for performing the one or multiple firmware update steps associated with the first sub update file and the second sub update file. However, the method of performing the one or multiple firmware update steps associated with the first sub update file and the second sub update file adopted by the embedded electronic device 100 does not limit the scope of the present invention.

Figure 10:
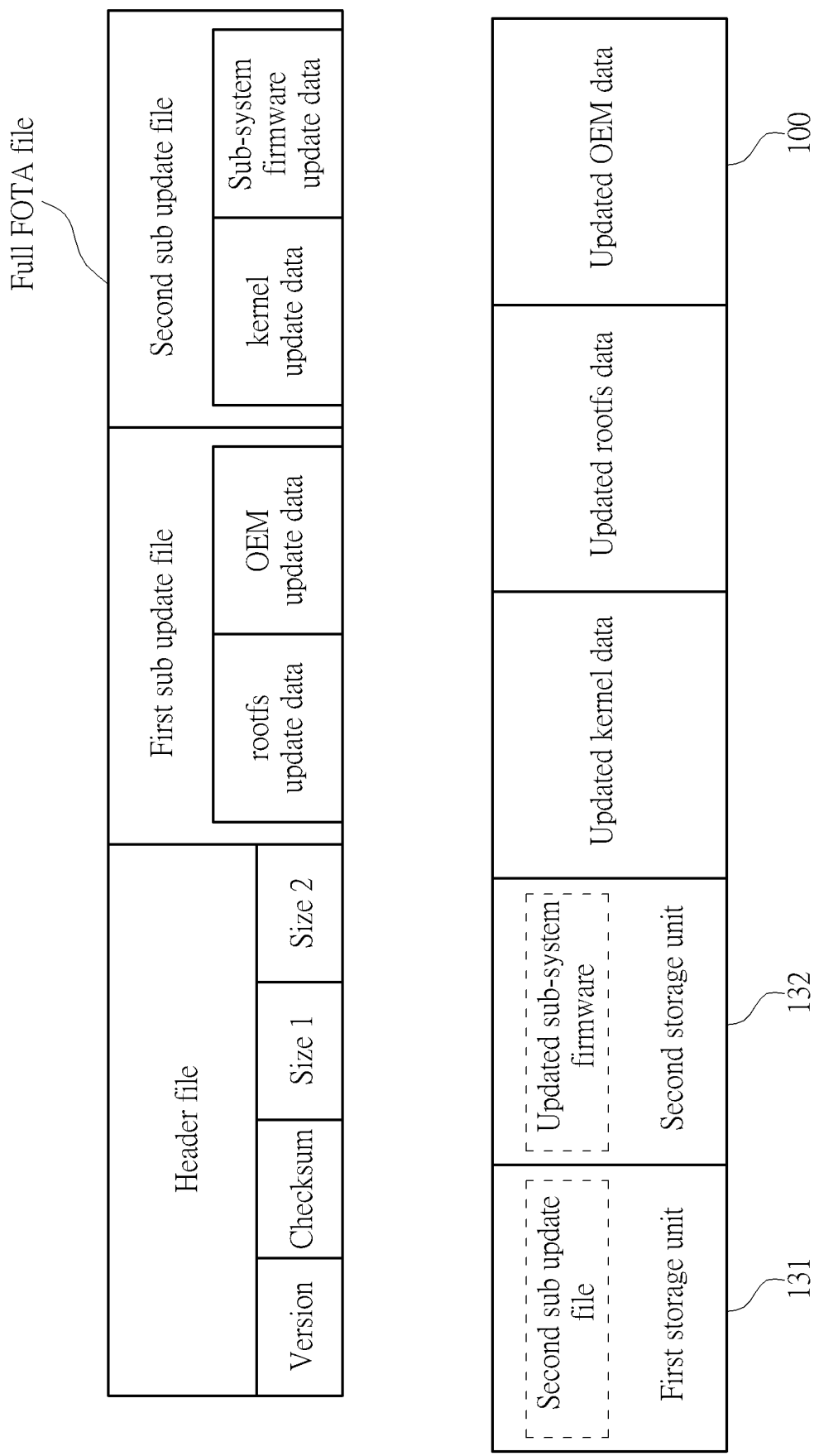
FIG. 10 is a diagram illustrating the data structure in the embedded electronic device after performing the full firmware update procedure according to an embodiment of the present invention.

FIG. 10 is a diagram illustrating the data structure in the embedded electronic device 100 after performing the full firmware update procedure using FOTA technology according to an embodiment of the present invention. After completing the full firmware update procedure, the updated rootfs data, the updated OEM data, the updated kernel data, and the updated sub-system firmware is stored in the embedded electronic device 100.

In conclusion, for an embedded electronic device with limited built-in memory space, the present invention performs the full firmware update procedure using a multi-stage FOTA technology. The firmware update steps associated with the sub-system firmware update data are performed at the last stage, so that the second storage unit 132 of the sub-system module 120 may provide extra memory space for supporting the full firmware update procedure before updating the current sub-system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a full firmware update procedure on an embedded electronic device, comprising:
    dividing a full firmware update file into a plurality pieces of update data;
    arranging the plurality pieces of update data into a first sub update file and a second sub update file;
    creating a header file associated with a size of each sub update file;
    merging the header file, the first sub update file and the second sub update file sequentially into a full firmware over-the-air (FOTA) file;
    uploading the full FOTA file to the embedded electronic device;
    extracting the first sub update file from the full FOTA file based on the header file and storing the extracted first sub update file in a first storage unit of the embedded electronic device;
    freeing up memory space of a second storage unit in a sub-system module of the embedded electronic device;
    extracting the second sub update file from the full FOTA file based on the header file and storing the extracted second sub update file in the second storage unit;
    performing one or multiple firmware update steps associated with the first sub update file stored in the first storage unit at a first time point;
    copying the second sub update file stored in the second storage unit to the first storage unit at a second time point which occurs after the first time point; and
    performing one or multiple firmware update steps associated with the second sub update file stored in the first storage unit at a third time point which occurs after the second time point, wherein:
        the first storage unit provides a first available memory space during an operation of the embedded electronic device;
        the second storage unit provides a second available memory space during the operation of the embedded electronic device;
        a size of the full FOTA file is larger than a size of the first available memory space; and
        the size of the full FOTA file is not larger than a total size of the first available memory space and the second available memory space.

2. The method of claim 1, wherein:
    the full firmware update file is divided into (M+N) pieces of update data;

the first sub update file includes N pieces of update data;
the second sub update file includes M pieces of update data;
M and N are positive integers;
the M pieces of update data at least includes a sub-system firmware update data; and
a content of each piece of update data in the first sub update file is different from a content of each piece of update data in the second sub update file.

3. The method of claim 2, wherein:
the N pieces of update data in the first sub update file includes a kernel update data, a root file system update data or an original equipment manufacturer (OEM) update data; and
the M pieces of update data in the second sub update file further includes any of the kernel update data, the root file system update data and the OEM update data which is not included in the N pieces of update data of the first sub update file.

4. The method of claim 1, further comprising:
determining a value of M and a value of N according to a ratio of the size of the first available memory space to the size of the second available memory space.

5. The method of claim 1, further comprising:
creating the header file associated with the size of each sub update file and a checksum;
determining whether the full FOTA file can pass an accuracy verification after uploading the full FOTA file to the embedded electronic device; and
extracting the first sub update file from the full FOTA file and extracting the second sub update file from the full FOTA file according to the header file after determining that the full FOTA file can pass the accuracy verification.

6. The method of claim 5, further comprising:
sending a notification of firmware update failure and exiting the full firmware update procedure when determining that the full FOTA file cannot pass the accuracy verification after being uploaded to the embedded electronic device.

7. The method of claim 1, further comprising:
determining whether the first sub update file is complete after storing the extracted first sub update file in the first storage unit; and
after determining that the first sub update file is complete, restarting the embedded electronic device at the first time point for performing the one or multiple firmware update steps associated with the first sub update file stored in the first storage unit.

8. The method of claim 7, further comprising:
sending a notification of firmware update failure and exiting the full firmware update procedure when determining that the first sub update file is not complete after being stored in the first storage unit.

9. The method of claim 1, further comprising:
determining whether the second sub update file is complete after copying the extracted second sub update file to the first storage unit; and
after determining that the second sub update file is complete, restarting the embedded electronic device at the third time point for performing the one or multiple firmware update steps associated with the second sub update file stored in the first storage unit.

10. The method of claim 9, further comprising:
sending a notification of firmware update failure and exiting the full firmware update procedure when determining that the second sub update file is not complete after being copied to the first storage unit.

11. An embedded electronic device which performs a full firmware update procedure, comprising:
a first storage unit configured to provide a first available memory space during an operation of the embedded electronic device;
a sub-system module having a built-in second storage unit configured to provide a second available memory space during the operation of the embedded electronic device; and
a processing module configured to:
receive a full firmware over-the-air (FOTA) file associated with a full firmware update file and including a header file, a first sub update file and a second sub update file;
extract the first sub update file from the full FOTA file based on the header file and store the extracted first sub update file in the first storage unit;
free up memory space of the second storage unit in the sub-system module;
extract the second sub update file from the full FOTA file based on the header file and store the extracted second sub update file in the second storage unit;
perform one or multiple firmware update steps associated with the first sub update file stored in the first storage unit at a first time point;
copy the second sub update file stored in the second storage unit to the first storage unit at a second time point which occurs after the first time point; and
perform one or multiple firmware update steps associated with the second sub update file stored in the first storage unit at a third time point which occurs after the second time point, wherein:
the full firmware update file is divided into a plurality pieces of update data;
the plurality pieces of update data are arranged into the first sub update file and the second sub update file;
the header file is associated with a size of each sub update file;
a size of the full FOTA file is larger than a size of the first available memory space; and
the size of the full FOTA file is not larger than a total size of the first available memory space and the second available memory space.

12. The embedded electronic device of claim 11, wherein:
the full firmware update file is divided into (M+N) pieces of update data;
the first sub update file includes N pieces of update data;
the second sub update file includes M pieces of update data;
M and N are positive integers;
the M pieces of update data at least includes a sub-system firmware update data; and
a content of each piece of update data in the first sub update file is different from a content of each piece of update data in the second sub update file.

13. The embedded electronic device of claim 12, wherein:
the N pieces of update data in the first sub update file includes a kernel update data, a root file system update data or an original equipment manufacturer (OEM) update data; and
the M pieces of update data in the second sub update file further includes any of the kernel update data, the root file system update data and the OEM update data which is not included in the N pieces of update data of the first sub update file.

14. The embedded electronic device of claim 11, wherein a value of M and a value of N are determined according to a ratio of the size of the first available memory space to the size of the second available memory space.

15. The embedded electronic device of claim 11, wherein:
the header file is associated with the size of each sub update file and a checksum; and
the processing module is further configured to:
determine whether the full FOTA file can pass an accuracy verification after receiving the full FOTA file; and
extract the first sub update file from the full FOTA file and extracting the second sub update file from the full FOTA file according to the header file after determining that the full FOTA file can pass the accuracy verification.

16. The embedded electronic device of claim 11, wherein the processing module is further configured to send a notification of firmware update failure and exit the full firmware update procedure when determining that the full FOTA file cannot pass the accuracy verification after receiving the full FOTA file.

17. The embedded electronic device of claim 11, wherein the processing module is further configured to:
determine whether the first sub update file is complete after storing the extracted first sub update file in the first storage unit; and
after determining that the first sub update file is complete, restart the embedded electronic device at the first time point for performing the one or multiple firmware update steps associated with the first sub update file stored in the first storage unit.

18. The embedded electronic device of claim 17, wherein the processing module is further configured to send a notification of firmware update failure and exit the full firmware update procedure when determining that the first sub update file is not complete after being stored in the first storage unit.

19. The embedded electronic device of claim 11, wherein the processing module is further configured to:
determine whether the second sub update file is complete after copying the extracted second sub update file to the first storage unit; and
after determining that the second sub update file is complete, restart the embedded electronic device at the third time point for performing the one or multiple firmware update steps associated with the second sub update file stored in the first storage unit.

20. The embedded electronic device of claim 19, wherein the processing module is further configured to send a notification of firmware update failure and exit the full firmware update procedure when determining that the second sub update file is not complete after being copied to the first storage unit.

* * * * *